United States Patent [19]

Aoki

[11] Patent Number: 4,958,785
[45] Date of Patent: Sep. 25, 1990

[54] FISHING REEL DRAG MECHANISM

[75] Inventor: Atsuhito Aoki, Hiroshima, Japan

[73] Assignee: Ryobi Ltd., Hiroshima, Japan

[21] Appl. No.: 271,964

[22] Filed: Nov. 16, 1988

[30] Foreign Application Priority Data

Nov. 26, 1987 [JP] Japan .................. 62-180869

[51] Int. Cl.$^5$ .......................... A01K 89/033
[52] U.S. Cl. ................................. 242/295
[58] Field of Search ............... 242/217, 211, 84.5 R, 242/84.51 R, 84.5 A, 84.51 A, 295, 302, 258, 268, 259, 260, 261, 262

[56] References Cited

U.S. PATENT DOCUMENTS

| | | | |
|---|---|---|---|
| 659,477 | 10/1900 | Holzmann | 242/84.51 R X |
| 847,890 | 3/1907 | Blackburn | 242/84.5 R |
| 2,080,900 | 5/1937 | Shakespeare | 242/84.5 R |
| 2,568,245 | 9/1951 | McDonald | 242/84.5 R |
| 4,738,410 | 4/1988 | Yamaguchi | 242/217 |
| 4,742,974 | 5/1988 | Furomoto | 242/217 |
| 4,775,113 | 10/1988 | Emura | 242/217 X |

FOREIGN PATENT DOCUMENTS

62-107672 7/1987 Japan .

*Primary Examiner*—Katherine Matecki
*Attorney, Agent, or Firm*—Finnegan, Henderson, Farabow, Garrett, and Dunner

[57] ABSTRACT

There is disclosed a fishing reel drag mechanism for a spool shaft supported at both ends, comprising a pinion engaged with a master gear on a master gear shaft, a bearing for supporting the master gear shaft capable of axial movement relative to said master gear shaft but not rotation relative thereto, a ratchet wheel attached to an outer circumferential edge of the bearing which is engaged with the master gear by a one-way pawl arrangement, an a drag control arrangement which, when tightened, pushes the bearing inward on the master shaft, thus engaging the ratchet with the one-way pawl arrangement. When the spool is rotated in a reverse counterclockwise direction to pay out the fishing line, the pinion causes the master gear to rotate in a reverse counterclockwise direction. When the drag control lever is tightened down, so that the ratchet engages the one-way pawl, a braking force is applied to the master gear, thus braking the pinion and reel rotation. The magnitude of the braking force can be grossly adjusted with the drag control lever, and finally adjusted with the threaded presetting nut.

5 Claims, 4 Drawing Sheets

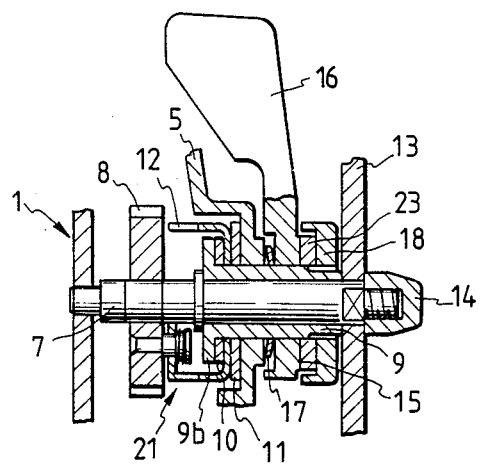
FIG. 6
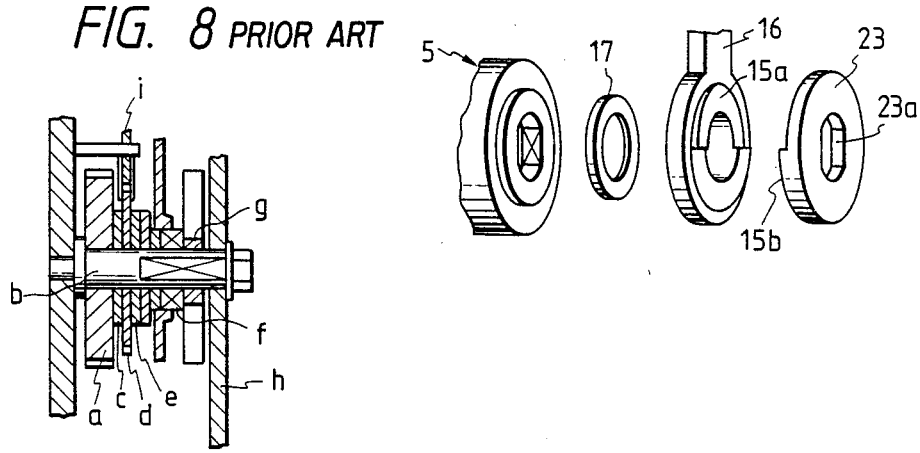
FIG. 7
FIG. 8 PRIOR ART

FISHING REEL DRAG MECHANISM

BACKGROUND OF THE INVENTION

1. Field of the Invention

The present invention relates to a fishing reel, and more particularly to a fishing reel having a drag mechanism for a spool shaft supported at both ends.

2. Description of the Prior Art

A conventional fishing reel drag mechanism for a spool shaft supported at both ends is shown in FIG. 8. In the conventional drag mechanism, a master gear shaft (b) for a master gear (a) engaged with a pinion, which is fitted on the spool shaft so that the pinion can be engaged with the spool shaft, is fitted with a washer (c), a ratchet wheel (d), a washer (e) and a bearing (f) in that order from the side of the master gear. A drag control knob (g) is engaged with the master gear (b). A handle (h) is secured to the tip of the master gear shaft (b). When the master gear (a) is rotated backward, a backward rotation preventive pawl (i) engages the ratchet wheel (d). Since the drag control knob (g) is rotated together with the master gear shaft (b) at the time of the backward rotation of the master gear (a), the braking force of the drag mechanism cannot be adequately controlled when the master gear is rotating backward.

An object of the present invention is to solve the problem of reduced braking force during backward rotation of the master gear, associated with conventional fishing reel drag mechanisms.

SUMMARY OF THE INVENTION

An object of the present invention is to overcome the problems and disadvantages of the prior art.

Another object of the present invention to provide a fishing reel drag mechanism for a spool shaft supported at both ends, whose braking force can be controlled by a drag control lever and a presetting nut even during backward rotation of a master gear, so as to facilitate the manipulation of the fishing reel. It is a further object to simplify the construction of the conventional drag mechanisms.

To achieve the objects and in accordance with the purpose of the present invention, as embodied and broadly described herein, the present invention comprises a fishing reel, a pinion, which is fitted on the spool shaft so that the pinion is engageable with the spool shaft, is engaged with a master gear on a master gear shaft. The master gear shaft is rotatably supported abutting the body of the reel and fitted at an opposed end with a handle for rotating the master gear shaft.

The present invention further contemplates a drag mechanism including a bearing for supporting the master gear shaft is formed with a flange and fitted in a side cover for the body of the fishing reel. The bearing can be moved in the same axial direction relative to the master gear shaft, but cannot be rotated relative to the master gear shaft. Washers and a ratchet wheel are rotatably fitted between the flange and side cover. A drag control cam, a drag control lever, a spring washer and a threaded presetting nut are provided on the bearing between the side cover and the handle. The presetting nut is engaged with a threaded end of the bearing. The master gear and the ratchet can be connected to each other by a one-way engagement means, which is put in a state of engagement for the connection only when the master gear is rotated backward, and the drag control lever is tightened down.

The bearing for the master gear shaft is formed with the flange to push the ratchet. The drag control cam, the drag control lever, and the presetting nut are provided outside the side cover. Therefore, the construction of the drag mechanism is simplified, the assembly is facilitated, and the production cost is reduced.

Since the master gear shaft is supported at both ends by the body of the fishing reel and the bearing located at the side cover, the master gear shaft experiences less uneven rotation. Therefore the fishing line can be easily wound by the reel.

DESCRIPTION OF THE DRAWINGS

The accompanying drawings, which are incorporated in and constitute a part of this specification, illustrate several embodiments of the present invention and together with the description, serve to explain the principles of the present invention.

FIG. 6 is a longitudinal sectional view of a fishing reel drag mechanism which is another embodiment of the present invention;

FIG. 7 is an enlarged perspective view of the fishing reel drag mechanism shown in FIG. 6; and FIG. 8 is an enlarged longitudinal sectional view of a conventional fishing reel drag mechanism for a spool shaft supported at both ends.

DETAILED DESCRIPTION OF THE PREFERRED EMBODIMENT

Reference will now be made in detail to the present preferred embodiment of the invention as illustrated in the accompanying drawings.

Figure 1:
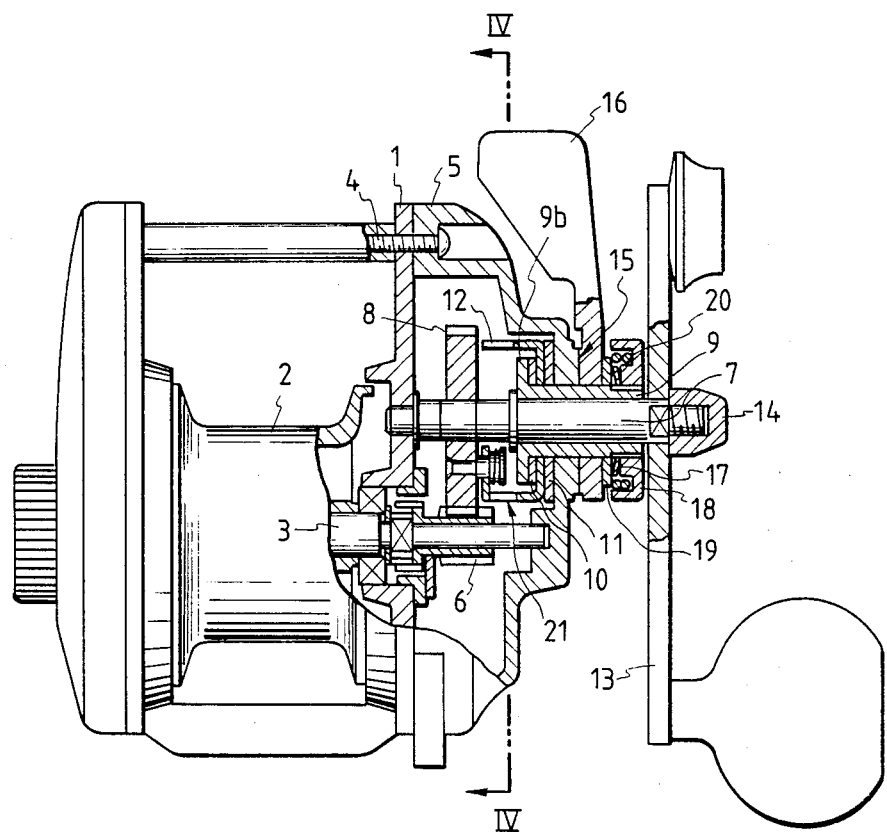
FIG. 1 is a longitudinal sectional view of a fishing reel drag mechanism of the present invention having a spool shaft supported at both ends thereof.
Figure 2:
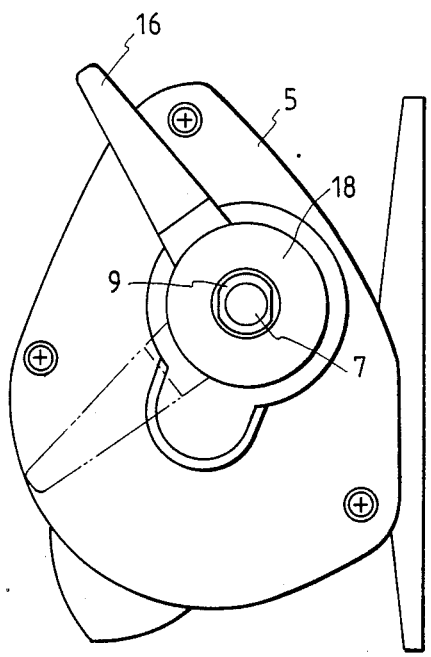
FIG. 2 is a side view of the fishing reel drag mechanism of the present invention.

FIGS. 1, 2, 3, 4 and 5 show a fishing reel drag mechanism which is one of the preferred embodiments, for a spool shaft 3 supported at both ends. In FIG. 1, a spool 2 is supported by the spool shaft 3 in the frame-like body 1 of the fishing reel so that the spool can be rotated in both the forward and backward directions. A pinion 6 is fitted on the spool shaft 3 at one end thereof, located in a side cover 5 that is secured to the reel body 1 by screws 4. The pinion 6 can selectively engage the spool shaft 3. This is achieved by manipulating the lever of a clutch (not shown). A master gear shaft 7 is supported in position by its two end portions, one of which is rotationally secured adjacent to one side of the reel body. In this way, the master gear shaft can rotate relative to the reel body and is secure from movement in the axial direction thereof. The master gear shaft 7, is secured to the master gear 8, and extends through a cylindrical bearing 9. The cylindrical bearing 9 extends through the side cover 5. The cylindrical bearing 9 includes a portion 9a shaped as a notched circle and fitted in a fitting hole 5a located in the side cover 5. As a result, bearing 9 can move relative to side cover 5 in the axial direction thereof, but cannot be rotated relative thereto. The bearing 9 is formed with a flange 9b at the inner end of the bearing. Washers 10 and 11 and a ratchet 12 are rotatably supported side by side on the outside circumferential surface of the bearing 9 between the flange 9b and the side cover 5. A handle 13 is secured to the tip of the master gear shaft 7 by a nut 14. A drag control cam 15, a drag control lever 16 and a spring washer 17 are provided on the bearing 9 between the body of the side cover 5 and the handle 13. A threaded presetting nut 18 is engaged with a threaded portion 9c of the bearing 9.

The drag control cam 15 comprises a first portion 15a formed on the surface of the side cover 5 and shaped stepwise along the axial direction thereof, and a second portion 15b formed on the surface of the drag control lever 16. The portions of the drag control cam 15 are placed in contact with each other. The drag control cam portion constituted by the drag control lever 16 is pushed on the other drag control cam portion 15a by the threaded presetting nut 18 though the actions of a washer 19, the spring washer 17 and a helical spring 20 which are provided outside the drag control lever 16. As a result, a reel braking force of the drag mechanism can be primarily controlled by turning the drag control lever 16 back or forth, and can be finely controlled by adjusting the presetting nut 18 back or forth.

Figure 3:
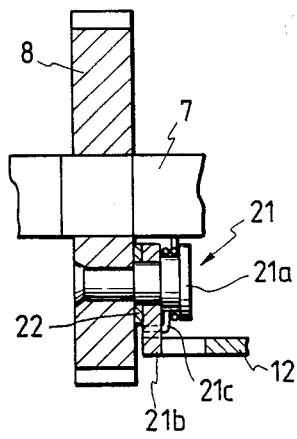
FIG. 3 is an enlarged longitudinal sectional view displaying the one-way engagement means of the fishing reel drag mechanism of the present invention.
Figure 4:
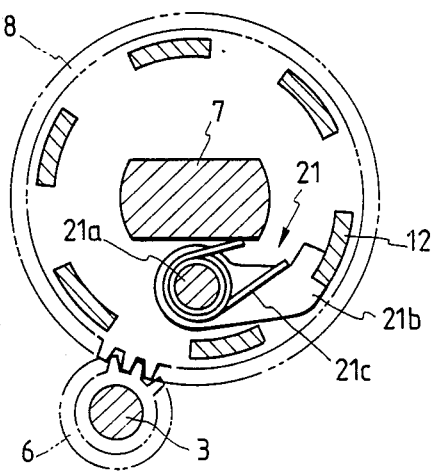
FIG. 4 is an enlarged cross-sectional view of the fishing reel drag mechanism of the present invention along a line IV—IV shown in FIG. 1.
Figure 5:
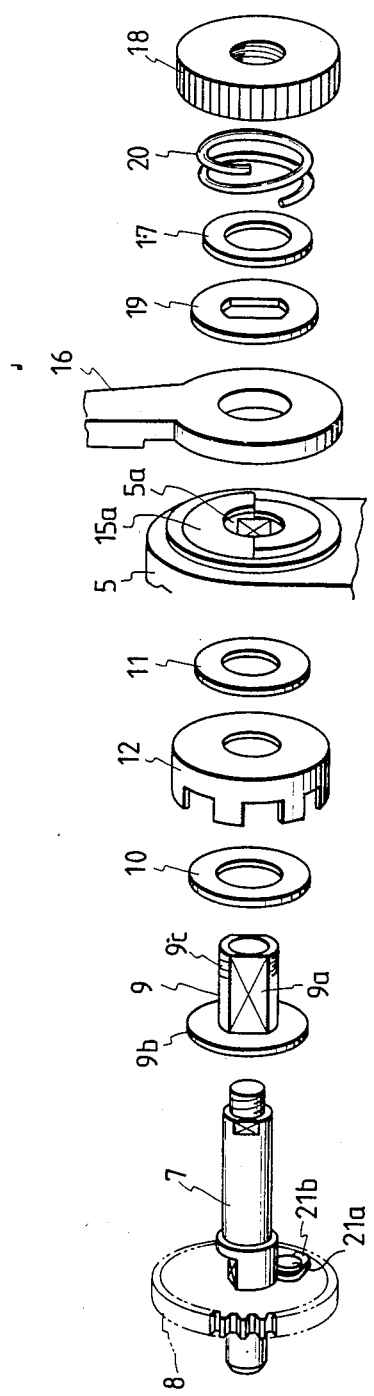
FIG. 5 is an enlarged perspective view of the fishing reel drag mechanism of the present invention.

The master gear 8 and the ratchet 12 can be connected to each other by a one-way engagement means 21, which is put in a state of engagement for the connection only when the master gear is rotated in a reverse direction (counterclockwise in FIG. 4). The one-way engagement means 21 comprises a pawl shaft 21a, a pawl 21b and a spring 21c as shown in FIGS. 3 and 4. The pawl 21b is rotatably supported at a side of the master gear 8 by the pawl shaft 21a, a pawl 21b, a spring 21c, and a washer 22 as shown in FIGS. 3 and 4. The pawl 21b is rotatably supported at a side of the master gear 8 by the pawl shaft 21a. The spring 21c is provided around the pawl shaft 21a and engaged at one end of the spring with the pawl 21b and at the other end thereof with the pawl shaft. The spring 21c urges the pawl in such a direction as to engage it with the ratchet 12. As a result, the pawl 21b is pushed and swung inward by the ratchet 12 at the time of forward rotation (clockwise in FIG. 4) of the master gear the force of the spring 21c. The pawl 21b is also engaged with the ratchet 12 by the force of the spring 21c at the time of reverse rotation (counterclockwise in FIG. 4) of the master gear 8.

When the handle 13 is rotated with the pinion 6 engaged with the spool shaft 3, as shown in FIG. 1, the spool 2 is rotated forward through the master gear 8, the pinion 6 and the spool shaft 3 to wind a fishline on the spool. Meanwhile the pawl 21b of the one-way engagement means 21 is rotated forward (clockwise in FIG. 4) together with the master gear, and therefore disengaged from the ratchet 12 so that the ratchet does not rotate.

When the fishline is unwound from the spool 2 so that the spool is rotated in a reverse direction, the pinion 6 is rotated clockwise (in FIG. 4) with the master gear 8 rotating counterclockwise (in FIG. 4) thereby engaging the pawl 21b with the ratchet 12. The ratchet 12 is rotated together with the pawl 21b to brake the rotation of the spool.

Another embodiment of the present invention is configured as shown in FIGS. 6 and 7, with a drag control cam member 23 provided in a drag mechanism. In the latter embodiment, a spring washer 17, a drag control lever 16, and the drag control cam member 23 are disposed between the outside of a side case 5 and a handle 13 engaged with a threaded presetting nut 18. A drag control cam 15 comprises a portion 15a constituted by the drag control cam member and located in contact with the former portion. A bearing 9 is fitted in the elliptic fitting hole 23a of the drag control cam member 23 so that the member can be moved relative to the bearing in the axial direction thereof but cannot be rotated relative thereto. The drag control lever 16 can be turned back or forth to control the spool braking force of the drag mechanism.

Additional advantages and modifications will readily occur to those skilled in the art. The present invention is not confined to the above-described details and embodiments. Accordingly, departures may be made from specific details without departing from the spirit or essential character of the invention.

What is claimed is:

1. A fishing reel comprising:
   a frame-like body;
   a side cover attached to the frame-like body;
   a spool shaft having opposite ends, being supported at both ends;
   a spool supported by said spool shaft;
   a pinion fitted on said spool shaft;
   a master gear engaging the pinion and mounted on a master gear shaft, one end of said master gear shaft rotatably secured adjacent said frame-like body;
   a handle for rotating said master gear shaft at an end of said master gear shaft opposite said frame-like body, the handle being spaced a predetermined distance away from said side cover;
   a generally cylindrical bearing for supporting said master gear shaft, said generally cylindrical bearing including a flange portion;
   a ratchet rotatably disposed on said cylindrical bearing;
   drag control means for generating and controlling a reel braking force during unwinding of fishline wound on said spool, said drag control means including:
   (a) a plurality of washer members for holding said ratchet between said cylindrical bearing and said side cover and for producing a frictional force therebetween;
   (b) a control lever rotatably mounted on said cylindrical bearing for adjusting said reel braking force, said control lever comprising a first cam portion;
   (c) a second cam portion disposed in opposing relationship to and engaging said first cam portion such that the frictional force produced by said washer members is adjusted by rotating said control lever;
   (d) presetting nut threadably engaging said cylindrical bearing for adjusting the reel braking force on the spool, said presetting nut being disposed between said control lever and said handle and including a spring washer; and
   (e) means for engaging said ratchet with said master gear.

2. The fishing reel of claim 1, wherein said engaging means comprises a pawl shaft disposed on a side of the master gear, a pawl provided on said pawl shaft and rotatably supported on the side of said master gear by said pawl shaft and a spring configured to urge said pawl into engagement with said ratchet.

3. The fishing reel of claim 1, wherein said bearing comprises a notched portion for preventing rotational movement of said bearing relative to said side cover and for allowing axial movement of said bearing relative to said side cover.

4. The fishing reel of claim 1, wherein said second cam portion comprises an outer surface of the side cover.

5. The fishing reel of claim 1, wherein said second cam portion comprises a drag control cam disposed between an outer surface of the side cover and the handle.

* * * * *